United States Patent
Lei et al.

(10) Patent No.: US 11,832,111 B2
(45) Date of Patent: Nov. 28, 2023

(54) DYNAMIC SPECTRUM SHARING BETWEEN 4G AND 5G WIRELESS NETWORKS

(71) Applicant: QUALCOMM Incorporated, San Diego, CA (US)

(72) Inventors: Jing Lei, San Diego, CA (US); Huilin Xu, San Diego, CA (US); Runxin Wang, San Diego, CA (US); Peter Pui Lok Ang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 17/161,408

(22) Filed: Jan. 28, 2021

(65) Prior Publication Data

US 2021/0243609 A1    Aug. 5, 2021

Related U.S. Application Data

(60) Provisional application No. 62/968,081, filed on Jan. 30, 2020.

(51) Int. Cl.
| | |
|---|---|
| *H04W 16/14* | (2009.01) |
| *H04L 5/00* | (2006.01) |
| *H04B 7/06* | (2006.01) |
| *H04W 72/21* | (2023.01) |
| *H04W 72/23* | (2023.01) |

(52) U.S. Cl.
CPC .......... *H04W 16/14* (2013.01); *H04B 7/0626* (2013.01); *H04L 5/0048* (2013.01); *H04L 5/0057* (2013.01); *H04W 72/21* (2023.01); *H04W 72/23* (2023.01)

(58) Field of Classification Search
CPC ............ H04W 16/14; H04W 72/0413; H04W 72/042; H04B 7/0626; H04L 5/0048; H04L 5/0057; H04L 5/0023; H04L 5/0055
See application file for complete search history.

(56) References Cited

U.S. PATENT DOCUMENTS

| | | | |
|---|---|---|---|
| 10,159,097 B2 * | 12/2018 | Ji | H04W 74/0866 |
| 2017/0208476 A1 * | 7/2017 | Khambekar | H04W 16/14 |
| 2019/0174462 A1 * | 6/2019 | Harada | H04L 5/0007 |
| 2019/0357264 A1 * | 11/2019 | Yi | H04L 1/1819 |
| 2020/0021998 A1 | 1/2020 | Baldemair et al. | |

OTHER PUBLICATIONS

International Search Report and Written Opinion—PCT/US2021/015678—ISA/EPO—dated May 14, 2021.

* cited by examiner

*Primary Examiner* — John D Blanton
(74) *Attorney, Agent, or Firm* — Loza & Loza LLP

(57) ABSTRACT

Aspects of the present disclosure provide various devices, methods, and systems for dynamic spectrum sharing of a spectrum between different radio access technologies and multiple frequency division duplexing modes. Dynamic spectrum sharing (DSS) is a technology that allows wireless network operators to share a spectrum between different radio access technologies (RATs). DSS allows an operator to dynamically allocate some existing 4G spectrum to 5G use to deliver 5G services using a shared spectrum.

28 Claims, 15 Drawing Sheets

DYNAMIC SPECTRUM SHARING BETWEEN 4G AND 5G WIRELESS NETWORKS

PRIORITY CLAIM

This application claims priority to and the benefit of U.S. provisional patent application No. 62/968,081 filed in the United States Patent Office on Jan. 30, 2020, the entire content of which is incorporated herein by reference as if fully set forth below in its entirety and for all applicable purposes.

TECHNICAL FIELD

The technology discussed below relates generally to wireless communication systems, and more particularly, to dynamic spectrum sharing between 4G and 5G wireless networks.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. Fifth-generation (5G) New Radio (NR) is a telecommunication standard promulgated by Third Generation Partnership Project (3GPP) to meet new requirements associated with latency, reliability, security, scalability (e.g., with Internet of Things (IoT)), and other requirements. Some aspects of 5G NR may be based on the fourth-generation (4G) Long Term Evolution (LTE) standard and resources. There exists a need for further improvements in 5G NR technology such that 5G NR is more scalable and deployable in a more efficient and cost-effective way.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

Some aspects of the present disclosure provide a method, a system, and apparatuses for dynamic spectrum sharing in wireless communication between different radio access technologies. An apparatus may use the method to identify a resource usage of a first radio access technology (RAT) in a resource pool for wireless communication. The apparatus may use the method to determine a scheduling constraint imposed by the resource usage of the first RAT for sharing the resource pool for wireless communication using a second RAT. The apparatus may use the method to allocate, based on the scheduling constraint, a resource of the resource pool for wireless communication using the second RAT. The apparatus may communicate with a user equipment (UE) using the resource allocated to the second RAT. In some aspects, the first RAT can be LTE, and the second RAT can be 5G New Radio (NR).

Another aspect of the present disclosure provides an apparatus for wireless communication. The apparatus includes a communication interface configured for wireless communication using dynamic spectrum sharing, a memory, and a processor operatively coupled with the communication interface and the memory. The processor and the memory are configured to identify a resource usage of a first radio access technology (RAT) in a resource pool for wireless communication. The processor and the memory are configured to determine a scheduling constraint imposed by the resource usage of the first RAT for sharing the resource pool for wireless communication using a second RAT. The processor and the memory are configured to allocate, based on the scheduling constraint, a resource of the resource pool for wireless communication using the second RAT. The processor and the memory are configured to communicate with a UE using the resource allocated to the second RAT.

Another aspect of the present disclosure provides an apparatus for wireless communication using dynamic spectrum sharing. The apparatus includes means for identifying a resource usage of a first radio access technology (RAT) in a resource pool for wireless communication. The apparatus further includes means for determining a scheduling constraint imposed by the resource usage of the first RAT for sharing the resource pool for wireless communication using a second RAT. The apparatus further includes means for allocating, based on the scheduling constraint, a resource of the resource pool for wireless communication using the second RAT. The apparatus further includes means for communicating with a UE using the resource allocated to the second RAT.

Another aspect of the present disclosure provides a non-transitory computer-readable medium storing computer-executable code at an apparatus for wireless communication using dynamic spectrum sharing. The computer-executable code causes a processor to identify a resource usage of a first radio access technology (RAT) in a resource pool for wireless communication. The computer-executable code further causes a processor to determine a scheduling constraint imposed by the resource usage of the first RAT for sharing the resource pool for wireless communication using a second RAT. The computer-executable code further causes a processor to allocate, based on the scheduling constraint, a resource of the resource pool for wireless communication using the second RAT. The computer-executable code further causes a processor to communicate with a user equipment (UE) using the resource allocated to the second RAT.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
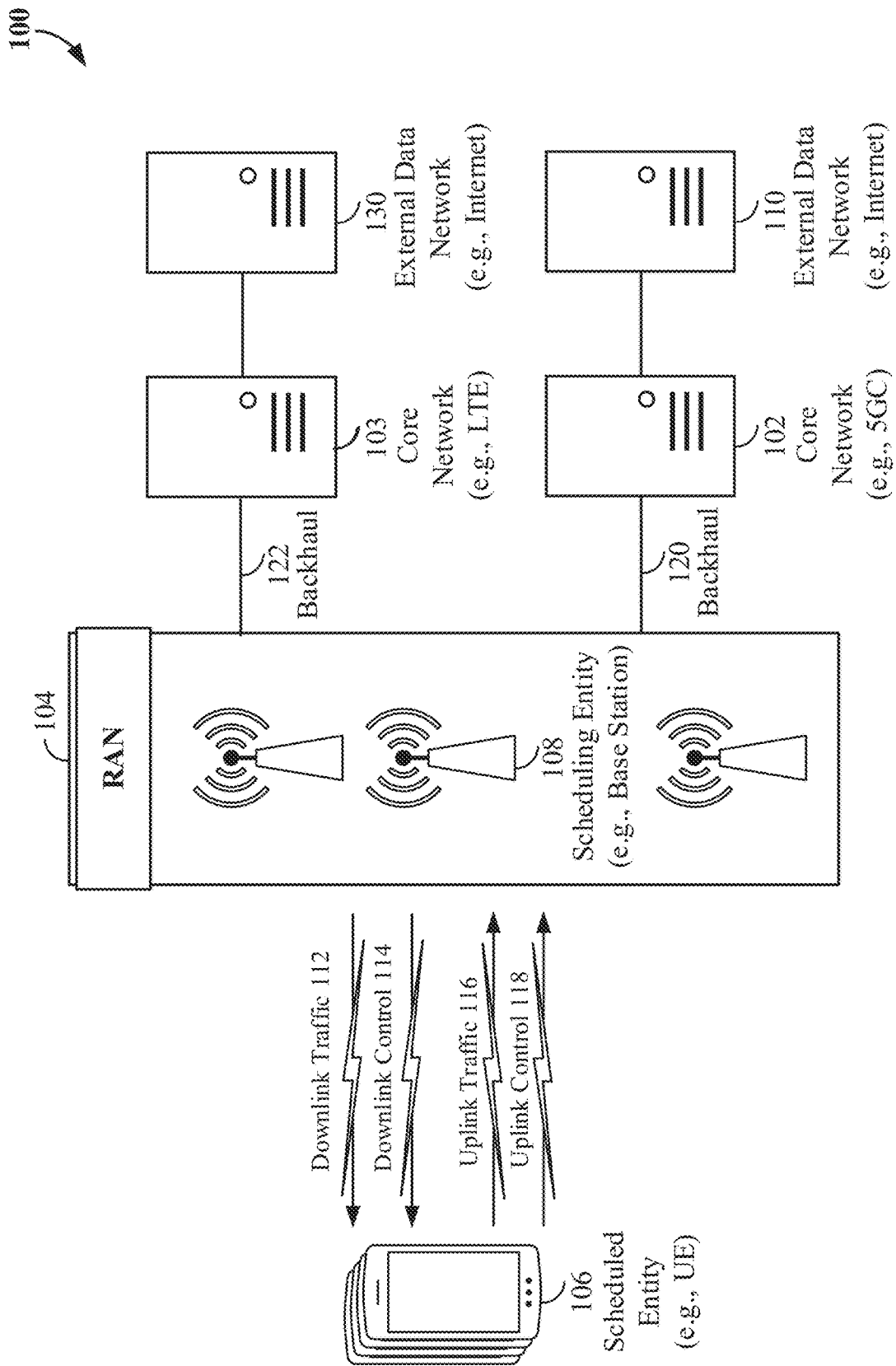
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Aspects of the present disclosure provide various devices, methods, and systems for dynamic spectrum sharing between different radio access technologies. Dynamic spectrum sharing (DSS) is a technology that allows wireless network operators to share a spectrum between different radio access technologies (RATs). In some examples, DSS allows an operator to dynamically allocate or share some existing 4G (e.g., LTE) spectrum with a 5G network (e.g., New Radio (NR)) to deliver 5G services using the shared spectrum.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: core networks 102 and 103, a radio access network (RAN) 104, and a user equipment (UE) 106. By virtue of the wireless communication system 100, the UE 106 may be enabled to carry out data communication with external data networks 110 and 130, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion (e.g., backhauls 120 and 122) of the wireless communication system. A first backhaul 120 may provide a link between a base station 108 and a 5G NR core network 102. A second backhaul 122 may provide a link between a base station 108 and a 4G core network 103 (e.g., LTE core network). Further, in some examples, a backhaul network (e.g., backhaul 213 in FIG. 2) may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
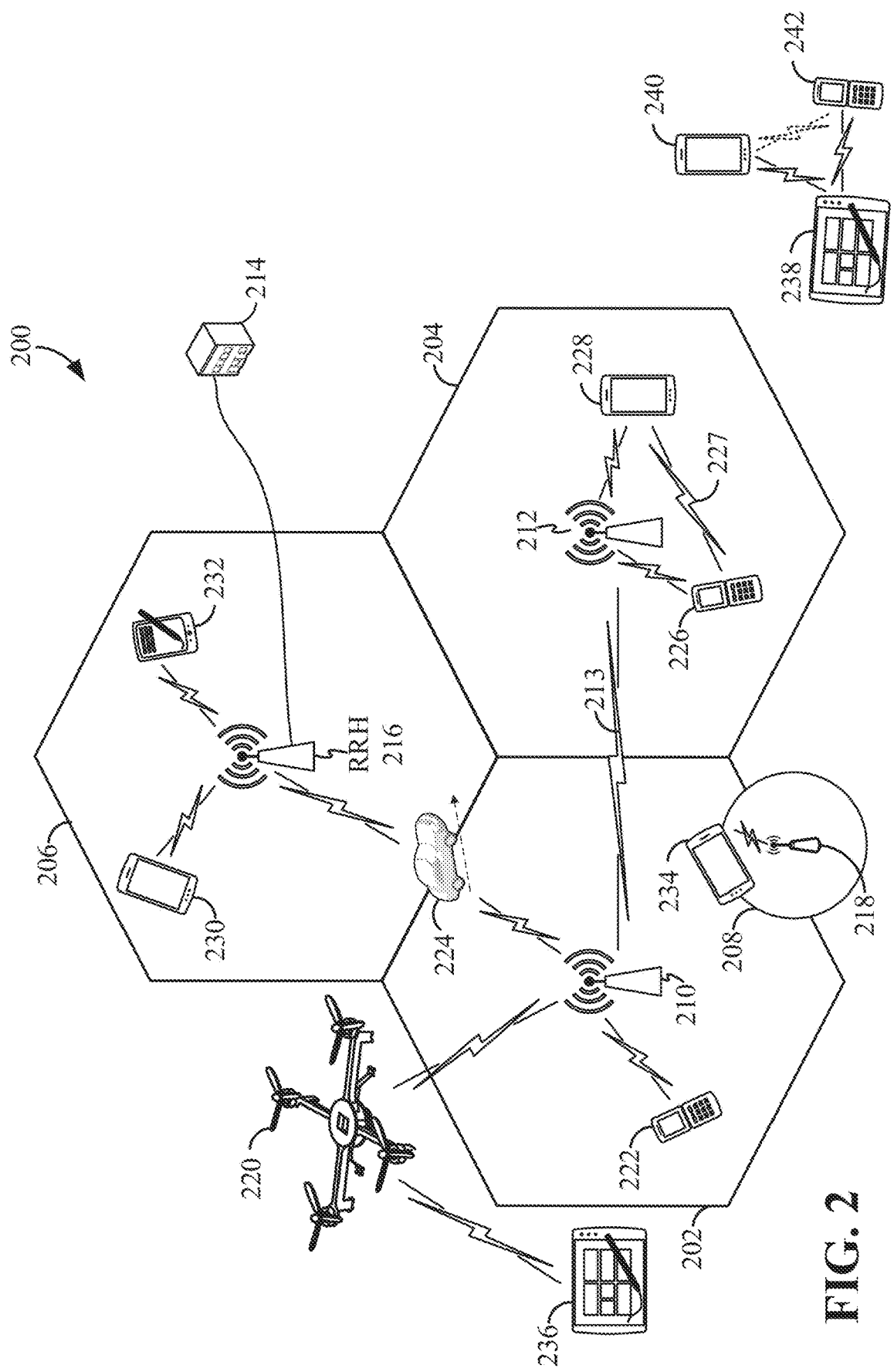
FIG. 2 is a conceptual illustration of an example of a radio access network according to some aspects.

FIG. 2 is an exemplary illustration of an example of a radio access network according to some aspects. Referring now to FIG. 2, by way of example and without limitation, a schematic illustration of a RAN 200 is provided. In some examples, the RAN 200 may be the same as the RAN 104 described above and illustrated in FIG. 1. In one example, the RAN 200 may be a RAN that supports both 4G RAT and 5G RAT (e.g., hybrid RAN or NG-RAN). The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1. In some examples, the base stations may support multiple radio access technologies (e.g., LTE and/or NR communication), and two base stations may communicate with each other through a backhaul link (e.g., backhaul 213) to coordinate resources allocation and scheduling in different RATs. For example, an LTE base station (e.g., base station 210) and a 5G NR base station (e.g., base station 212) may communicate to each other through a wired or wireless backhaul link 213 to coordinate communication resource allocation and scheduling to facilitate dynamic spectrum sharing (DSS) as described in this disclosure.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1. In some aspects, the UEs may communicate with the RAN 200 using different RATs (e.g., 4G RAT (e.g., LTE) and/or 5G RAT (e.g., NR Light)).

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

The air interface in the radio access network 200 may utilize one or more duplexing algorithms. Duplex refers to a point-to-point communication link where both endpoints can communicate with one another in both directions. Full duplex (FD) means both endpoints can simultaneously communicate with one another. Half duplex (HD) means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time-division multiplexing. That is, at some times the channel is dedicated for transmissions in one direction, while at other times the channel is dedicated for transmissions in the other direction, where the direction may change very rapidly, e.g., several times per slot.

In some aspects of the disclosure, the radio access network 200 may use half-duplex (HD) frequency division duplex (FDD) (HD-FDD) for the communication between a base station (e.g., base station 108) and a UE (e.g., NR Light UE). A HD-FDD type UE may be implemented with less complexity and cost because the duplexer may be replaced by a switch, and only a single phase-locked loop (PLL) is needed. A HD-FDD UE may be compatible with an FD-FDD network and may coexist with regular FDD UEs. HD-FDD can use different frequencies or bands for uplink and downlink communications, and the uplink and downlink communications are not only on distinct frequencies but are also separated in the time domain.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms as well as other waveforms.

Within the present disclosure, a frame refers to a duration of 10 ms for wireless transmissions, with each frame consisting of 10 subframes of 1 ms each. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each subframe 302 (e.g., a 1 ms subframe) may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels (e.g., physical downlink control channel (PDCCH)), and the data region 314 may carry data channels (e.g., physical downlink shared channel (PDSCH) or PUSCH). Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Figure 3:
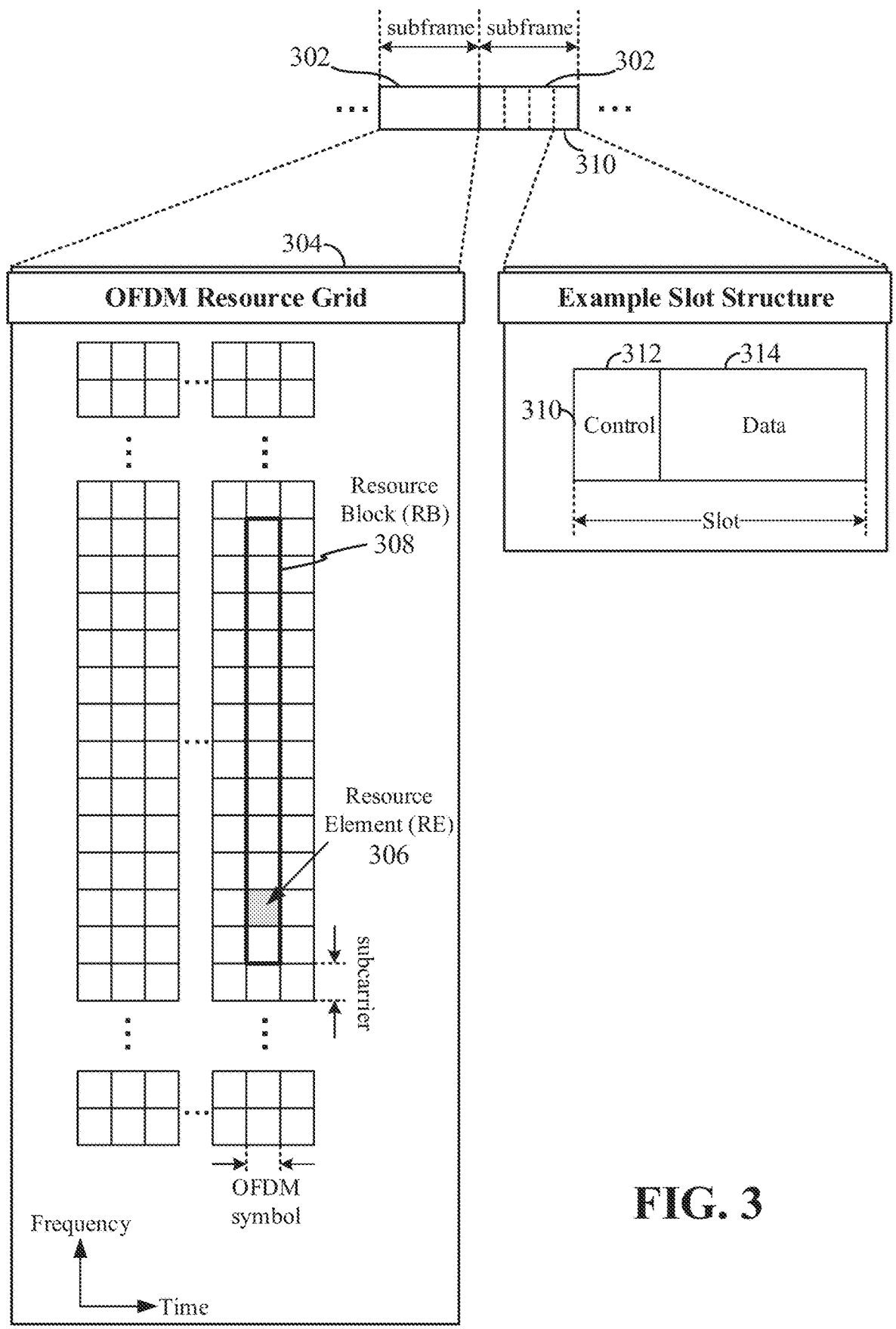
FIG. 3 is a schematic illustration of an organization of wireless resources in an air interface utilizing orthogonal frequency divisional multiplexing (OFDM) according to some aspects.

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices and a groupcast communication is delivered to a group of intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a PDCCH, to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic (e.g., user data). Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB and/or a sidelink CSI-RS, may be transmitted within the slot 310.

The channels or carriers described above and illustrated in FIGS. 1-3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels. These physical channels described above are generally multiplexed and mapped to transport channels for handling at the medium access control (MAC) layer. Transport channels carry blocks of information called transport blocks (TB). The transport block size (TB S), which may correspond to a number of bits of information, may be a controlled parameter, based on the modulation and coding scheme (MCS) and the number of RBs in a given transmission.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. In some aspects, the network (e.g., RAN 200) may use the same or different numerologies for different RATs (e.g., LTE and NR). A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 4:
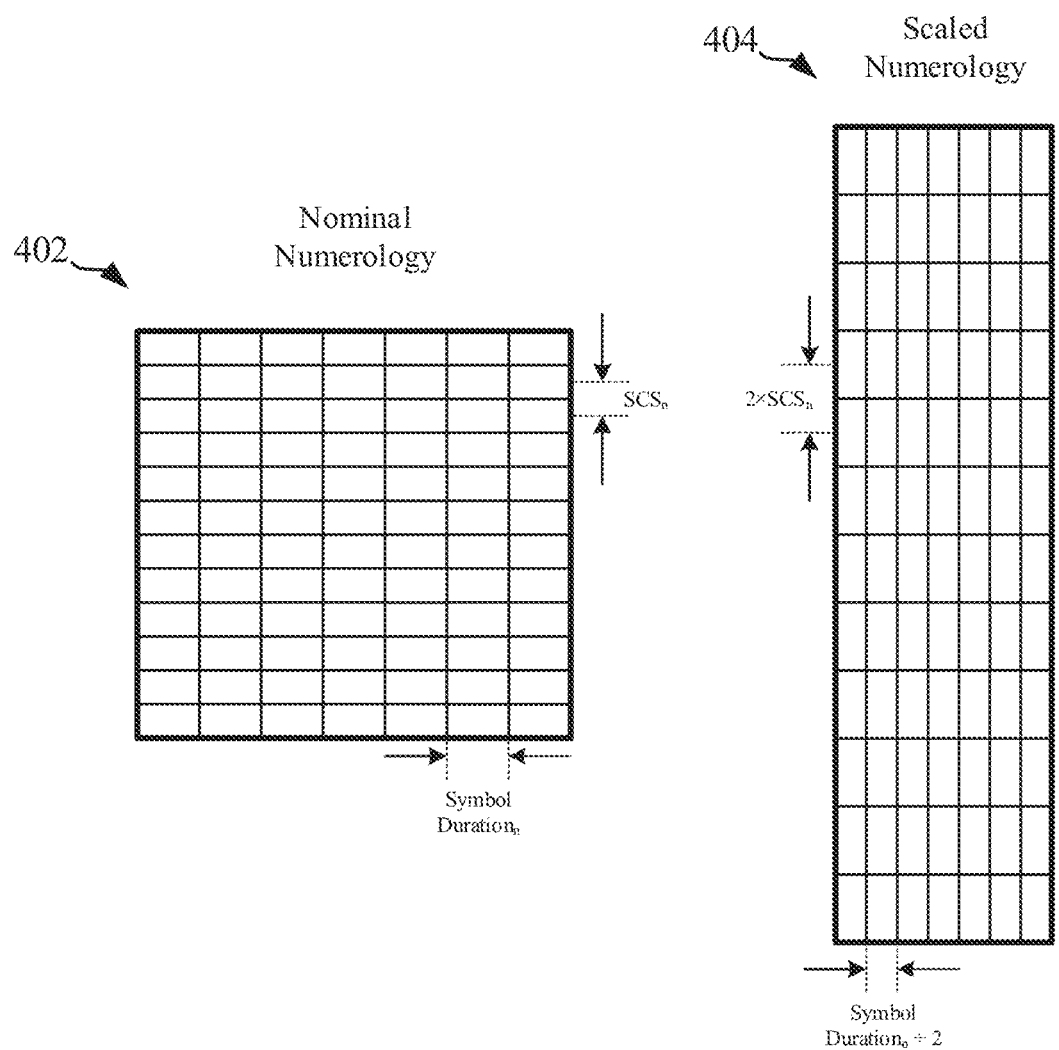
FIG. 4 is a schematic illustration of an OFDM air interface utilizing a scalable numerology according to some aspects.

To illustrate this concept of a scalable numerology, FIG. 4 shows a first RB 402 having a nominal numerology, and a second RB 404 having a scaled numerology. As one example, the first RB 402 may have a 'nominal' subcarrier spacing $(SCS_n)$ of 30 kHz, and a 'nominal' symbol duration$_n$ of 333 μs. Here, in the second RB 404, the scaled numerology includes a scaled SCS of double the nominal SCS, or $2 \times SCS_n = 60$ kHz. Because this provides twice the bandwidth per symbol, it results in a shortened symbol duration to carry the same information. Thus, in the second RB 404, the scaled numerology includes a scaled symbol duration of half the nominal symbol duration, or (symbol duration$_n$)÷2=167 μs.

Figure 5:
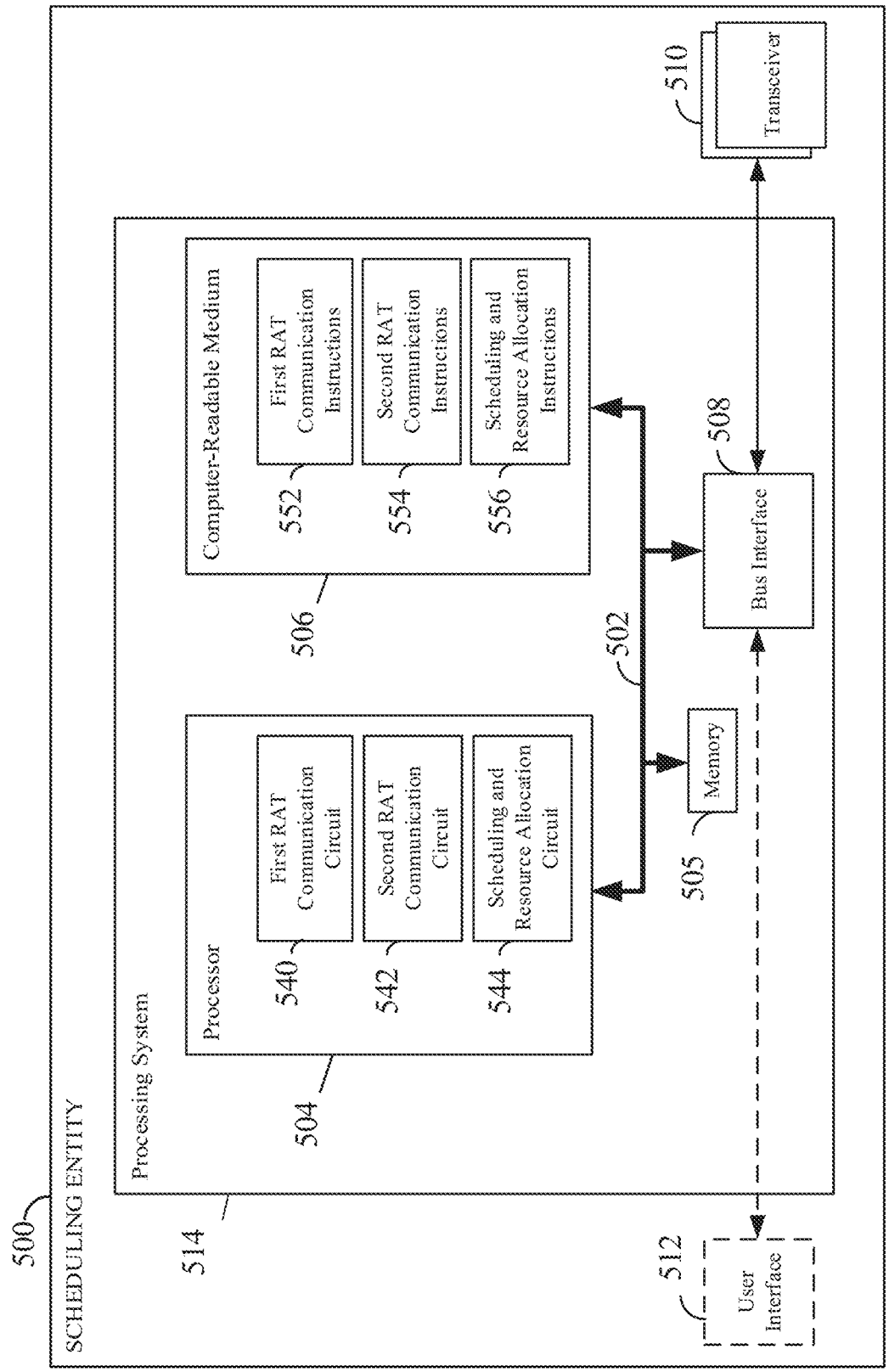
FIG. 5 is a block diagram conceptually illustrating an example of a hardware implementation for a scheduling entity according to some aspects.

FIG. 5 is a block diagram illustrating an example of a hardware implementation for a scheduling entity 500 employing a processing system 514. For example, the scheduling entity 500 may be a user equipment (UE) as illustrated in any one or more of FIGS. 1, 2, and/or 3. In another example, the scheduling entity 500 may be a base station as illustrated in any one or more of FIGS. 1, 2, and/or 3.

The scheduling entity 500 may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 500 may be configured to perform any one or more of the functions described herein. That is, the processor 504, as utilized in a scheduling entity 500, may be used to implement any one or more of the processes and procedures described below and illustrated in FIGS. 6-14.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a communication interface or means for communicating with various other apparatus over a transmission medium. In some examples, the transceiver 510 may include one or more transceivers and/or RF chains configured to use different radio access technologies (RATs), for example, LTE, 5G NR, etc. Depending upon the nature of the apparatus, a user interface 512 (e.g., keypad, display, speaker, microphone, joystick) may also be provided. Of course, such a user interface 512 is optional, and may be omitted in some examples, such as a base station.

In some aspects of the disclosure, the processor 504 may include circuitry configured for various functions, including, for example, dynamic spectrum sharing between different RATs (e.g., LTE and 5G NR). For example, the circuitry may be configured to implement one or more of the functions described in relation to FIGS. 6-14.

In one example, the processor 504 may include a first RAT communication circuit 540, a second RAT communication circuit 542, and a scheduling and resource allocation circuit 544. The scheduling entity may use the first RAT communication circuit 540 to perform various wireless communication functions via the transceiver 510 using a first RAT (e.g., LTE). The first RAT communication circuit 540 may perform various communication functions using the first RAT, for example, CRC functions, channel coding/decoding, rate matching, multiplexing/demultiplexing, scrambling/descrambling, modulation/demodulation, layer mapping/demapping, etc. The scheduling entity may use the second RAT communication circuit 542 to perform various wireless communication functions via the transceiver 510 using a second RAT (e.g., 5G NR). The second RAT communication circuit 542 may perform various communication functions using the second RAT, for example, CRC functions, channel coding/decoding, rate matching, multiplexing/demultiplexing, scrambling/descrambling, modulation/demodulation, layer mapping/demapping, etc. The processor may use the scheduling and resource allocation circuit 544 to perform various communication scheduling and resource allocation functions, for example, identifying resource usage by different RATs of a shared spectrum, scheduling UL and DL communication using a first RAT and a second RAT that share a spectrum, and allocating communication resources for communication using a first RAT and a second RAT that share a spectrum.

The processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 506 may include software configured for various functions, including, for example, dynamic spectrum sharing for communications using different RATs. For example, the software may be configured to implement one or more of the functions described in relation to FIGS. 6-14.

In one example, the software may include first RAT communication instructions 552, second RAT communication instructions 554, and scheduling and resource allocation instructions 556. The scheduling entity may execute the first RAT communication instructions 552 to perform the communication functions using the first RAT communication circuit 540 as described above. The scheduling entity may execute the second RAT communication instructions 554 to perform the communication functions using the second RAT communication circuit 542 as described above. The scheduling entity may execute the scheduling and resource allocation instructions 556 to perform the functions using the scheduling and resource allocation circuit 544 as described above.

DL Resource Allocation using Dynamic Spectrum Sharing

Figure 6:
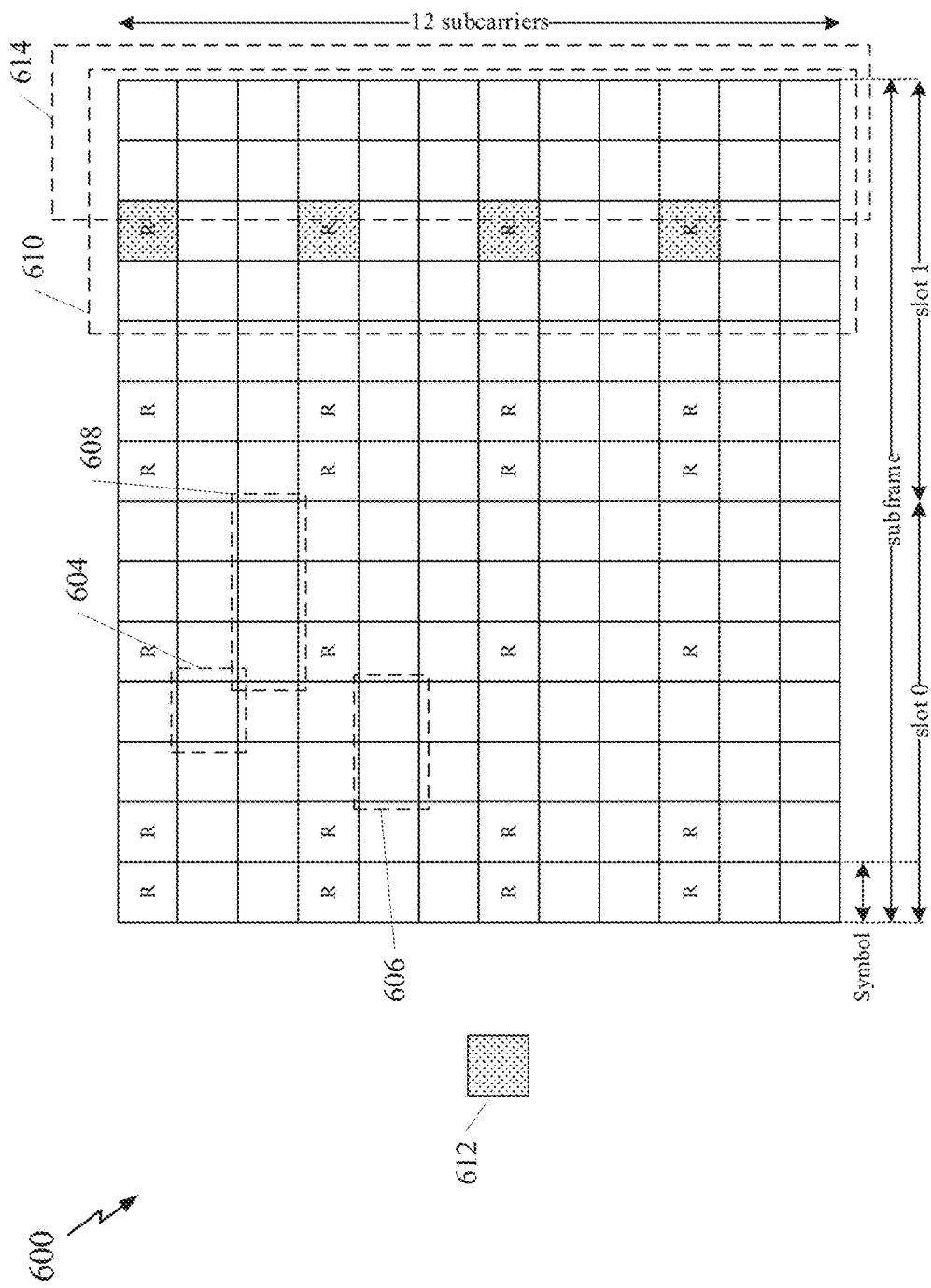
FIG. 6 is a diagram illustrating an exemplary downlink resource allocation using dynamic spectrum sharing (DSS) according to some aspects.

FIG. 6 is a diagram illustrating an exemplary downlink resource allocation using dynamic spectrum sharing (DSS) between LTE and NR bands in a DL carrier of an FDD wireless communication system. An exemplary LTE subframe 600 has 12 subcarriers in a spectrum that may be shared with an NR DL band using DSS. Dynamic spectrum sharing of FDD bands between NR and LTE provides a useful migration path from LTE to NR by allowing LTE and NR devices to share the same spectrum partially or completely. To facilitate DSS between LTE and NR, an LTE scheduling entity (e.g., eNB) and an NR scheduling entity (e.g., gNB) may coordinate their respective resource allocations and scheduling through backhaul communication.

In some aspects of the disclosure, an NR device (e.g., NR Light UE) may receive NR physical signals and channels using shared resources that are not occupied or used by certain LTE signals or channels, for example, cell-specific reference signals (CRS), CSI-RS, positioning reference signal (PRS), physical HARQ indicator channel (PHICH), physical control format indicator channel (PCFICH), PDSCH, and PDCCH. In some aspects, an NR UE may communicate with a base station using HD-FDD in a spectrum shared with LTE. In some aspects, certain LTE signals/channels (e.g., CRS, PHICH, PCFICH, PDCCH, etc.) are allocated to predetermined resource elements (REs) within an LTE subframe according to the LTE standards and cannot be moved to other resource locations within the LTE subframe. For example, the resources (e.g., time, frequency, and spatial resources) of the first two symbols of an LTE subframe, which may include the PHICH, PCFICH, and/or PDCCH, are not shared with NR DL. In other symbol locations, resources allocated to CRS (e.g., resources denoted as "R" in FIG. 6) in the LTE subframe 600 are also not shared with the NR DL. Other LTE subframe resources that have more scheduling flexibility may be shared with NR DL signals or channels through the coordination between the LTE base station and NR base station.

Within the LTE subframe 600, the resources that are available for sharing with NR may be classified into mini-slots spanning one or more LTE symbols. In one example, a scheduling entity (e.g., gNB) may schedule a 1-symbol mini-slot (e.g., mini-slot 604) for communicating the PDCCH, channel state information reference signal (CSI-RS), and/or tracking reference signal (TRS) of an NR device (e.g., NR light UE). In another example, a scheduling entity may schedule a 2-symbol mini-slot (e.g., mini-slot 606) or 3-symbol mini-slot (e.g., mini-slot 608) for communicating the synchronization signal block (SSB), PDCCH, PDSCH, CSI-RS, TRS, etc. of an NR device. The mini-slots shown in FIG. 6 are only for illustration purposes, and other configurations of available LTE resources may be shared with NR traffic to facilitate dynamic spectrum sharing (DSS) between LTE and NR. The numerology of the NR min-slots may be the same or different from the numerology of the LTE subframe 600.

In some aspects of the disclosure, an NR device (e.g., NR Light UE) may have reduced coverage due to, for example, fewer equipped antennas and/or use of less robust modulation and coding scheme than a more capable NR UE. For coverage recovery, the scheduling entity (e.g., gNB) may use signal repetition and/or frequency hopping at the mini-slot level to communicate with the UE. In one example, an NR base station may transmit DL signals (e.g., SSB, PDCCH, PDSCH, CSI-RS, and/or TRS) multiple times (i.e., repetition) in multiple mini-slots scheduled using resources shared with the LTE subframe 600. In another example, the NR base station may transmit DL signals (e.g., SSB, PDCCH, PDSCH, CSI-RS, and/or TRS) using frequency hopping between mini-slots that are located at different carriers or frequencies in a spectrum shared with LTE.

In some aspects of the disclosure, the numerology of the NR RAT can be the same or different from that of the LTE RAT. In one example, the LTE RAT may have a subcarrier spacing (SCS) of 15 kHz, and the NR RAT may have a subcarrier spacing of 15 kHz. For example, referring to FIG. 6, LTE resources from the 4th symbol through 7th symbol of the second slot, labeled slot 1, may be used for communicating an NR SSB 610. In this case, the SSB punctures the 2nd transmission occasion of CRS 612 from, for example, antenna ports 0 and 1, and the SSB rate-matches around the LTE CRS 612. In another example, the LTE RAT may have a subcarrier spacing of 15 kHz, and the NR RAT may have a subcarrier spacing of 30 kHz. Due to different numerology, two LTE symbols in the time domain can provide sufficient resources to carry the entire NR SSB 614 without the need to puncture the SSB around the LTE's CRS 612.

Figure 7:
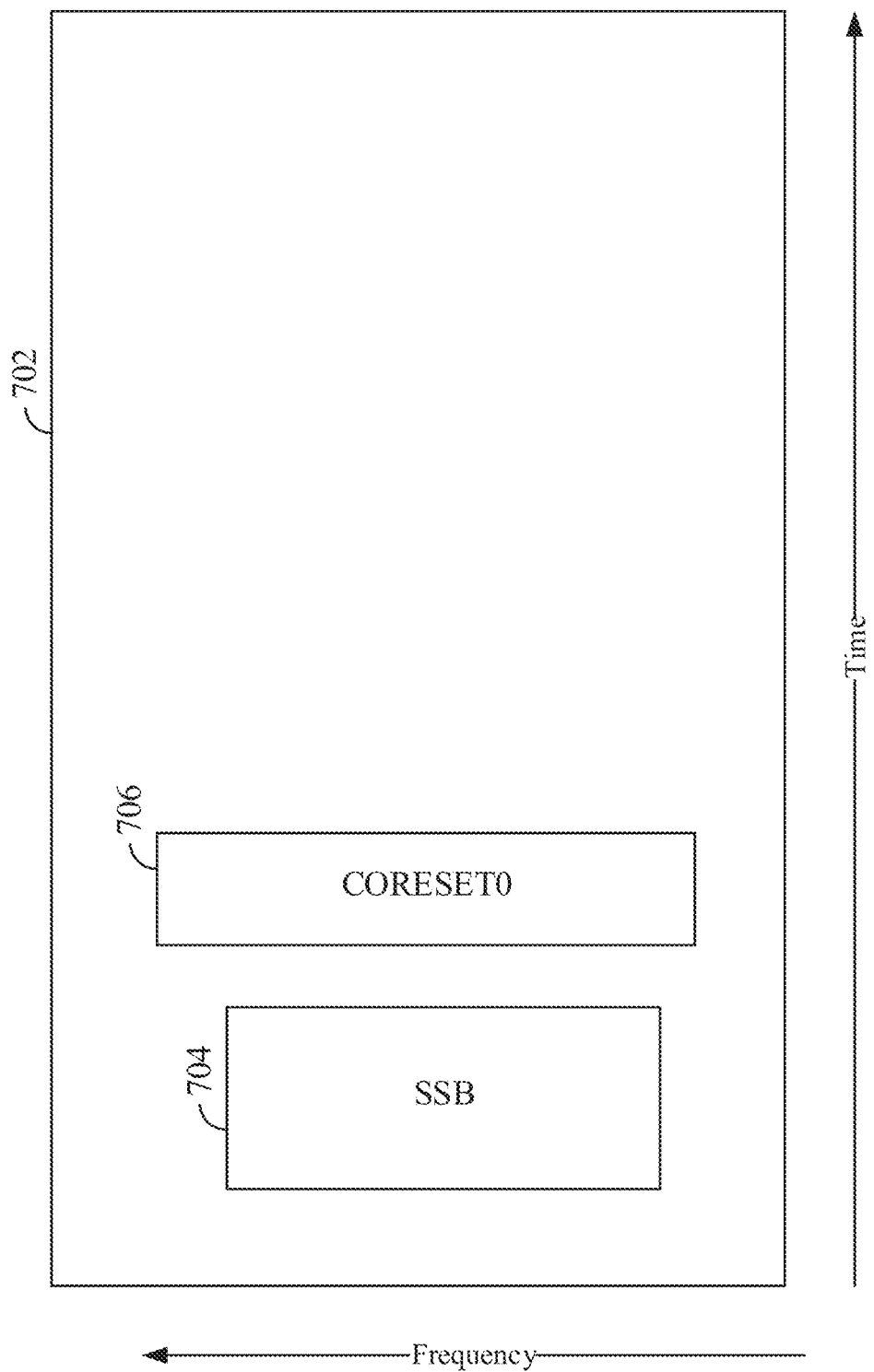
FIG. 7 is a diagram illustrating an exemplary scheduling of a synchronization signal block (SSB) and a CORESET for a 5G New Radio (NR) device using time division multiplexing (TDM).
Figure 8:
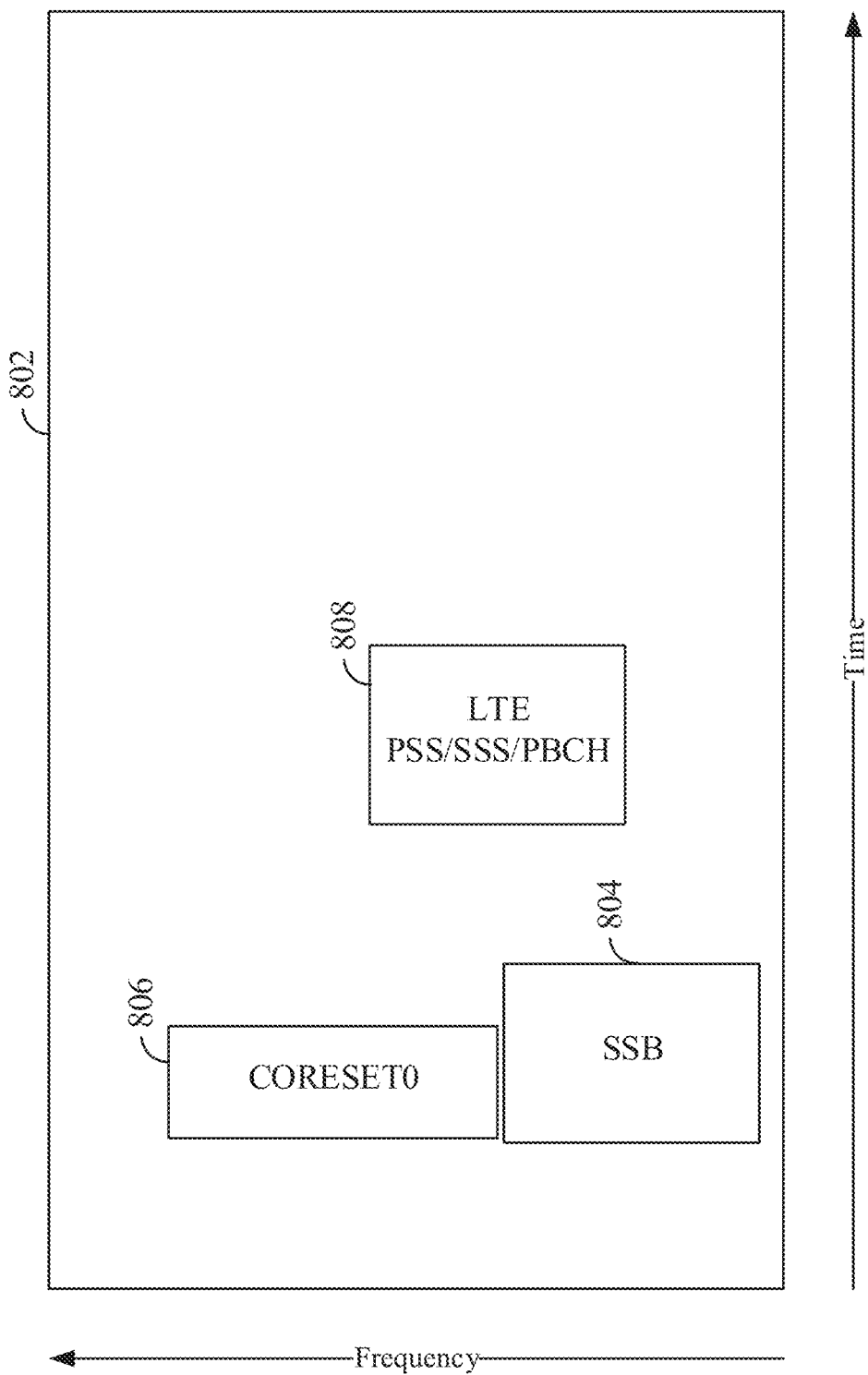
FIG. 8 is a diagram illustrating an exemplary scheduling of an SSB and a CORESET for a 5G NR device using frequency division multiplexing (FDM).

Depending on the maximum supported bandwidth of an NR UE, the scheduling entity may schedule the transmission of SSB and CORESET0 using TDM or FDM in resources shared with LTE. A CORESET (control resource set) is a set of physical resources (e.g., RBs) and a set of parameters that are used to carry PDCCH/DCI in an NR DL transmission. In general, a CORESET is configured using RRC signaling. CORESET0 is a special CORESET that carries the PDCCH. FIG. 7 is a diagram illustrating an exemplary scheduling of an NR SSB and a CORESET0 using TDM in a shared spectrum 702. The spectrum 702 may include one or more RBs shared between LTE and NR. In this case, the combined bandwidth of the NR SSB 704 and CORESET0 706 is larger than the maximum supported bandwidth of the NR device (e.g., NR Light UE). Therefore, the scheduling entity may schedule the SSB 704 and CORESET0 706 to different time domain resources using TDM. The SSB and CORESET0 may be transmitted in the same or different slots, and the numerology of the slot may be based on the subcarrier spacing (SCS) of the NR band. FIG. 8 is a diagram illustrating an exemplary scheduling of an NR SSB and a CORESET0 using FDM in a shared spectrum 802. In this case, the combined bandwidth of the NR SSB 804 and CORESET0 806 is not larger than the maximum supported bandwidth of the NR device. Therefore, the scheduling entity may schedule the SSB 804 and CORESET0 806 to different frequency domain resources using FDM.

In some aspects of the disclosure, the frequency domain mapping for the NR SSB may be based on a set of pre-defined non-zero frequency offsets (e.g., RB or RB group (RBG) level) or slot-level offsets with respect to the PSS, SSS, and PBCH of the LTE band. Using the frequency and/or slot-level offsets can reduce interference between the synchronization and control signals of NR and LTE bands. For example, in FIG. 8, the NR SSB 804 can be allocated to shared resources (e.g., REs or RBGs) that are frequency and/or slot-level offset (non-overlapping) from the LTE PSS/SSS/PDCH 808.

Figure 9:
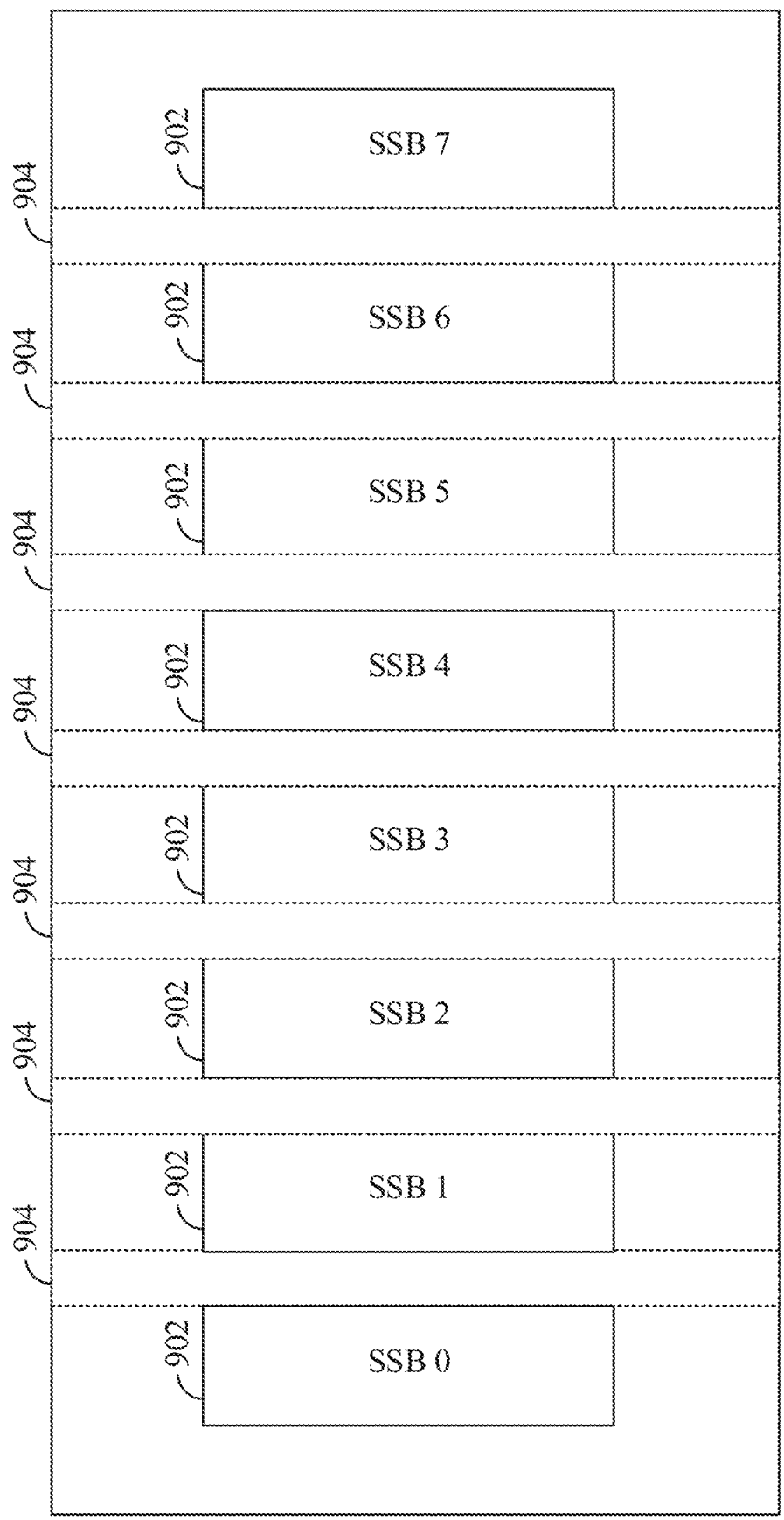
FIG. 9 is a diagram illustrating an SSB burst according to one aspect.

To support SSB beamforming, an NR SSB burst may be time-multiplexed, frequency-multiplexed, and/or space-multiplexed with LTE resources in the same or adjacent subframes. FIG. 9 is a diagram illustrating an NR SS burst in resources shared with LTE. In this example, the SS burst may include eight SSBs 902 (denoted as SSB 0 to SSB 7 in FIG. 9). Each of the SSBs may be mapped to a different beam index (e.g., beam 0 to beam 9) corresponding to a different beam direction. These SSBs with different beam directions may be time-multiplexed with LTE resources 904 in the same subframe or different subframes.

UL Resource Allocation Using DSS

Some of the concepts described above in relation to DL resource allocation using DSS may be applied to UL resource allocation. For example, in a spectrum shared with an LTE UL subframe, a scheduling entity may schedule NR UL transmission at certain LTE symbol locations, and the UL resources available for NR communication can be classified into mini-slots spanning one or more LTE symbols.

Figure 10:
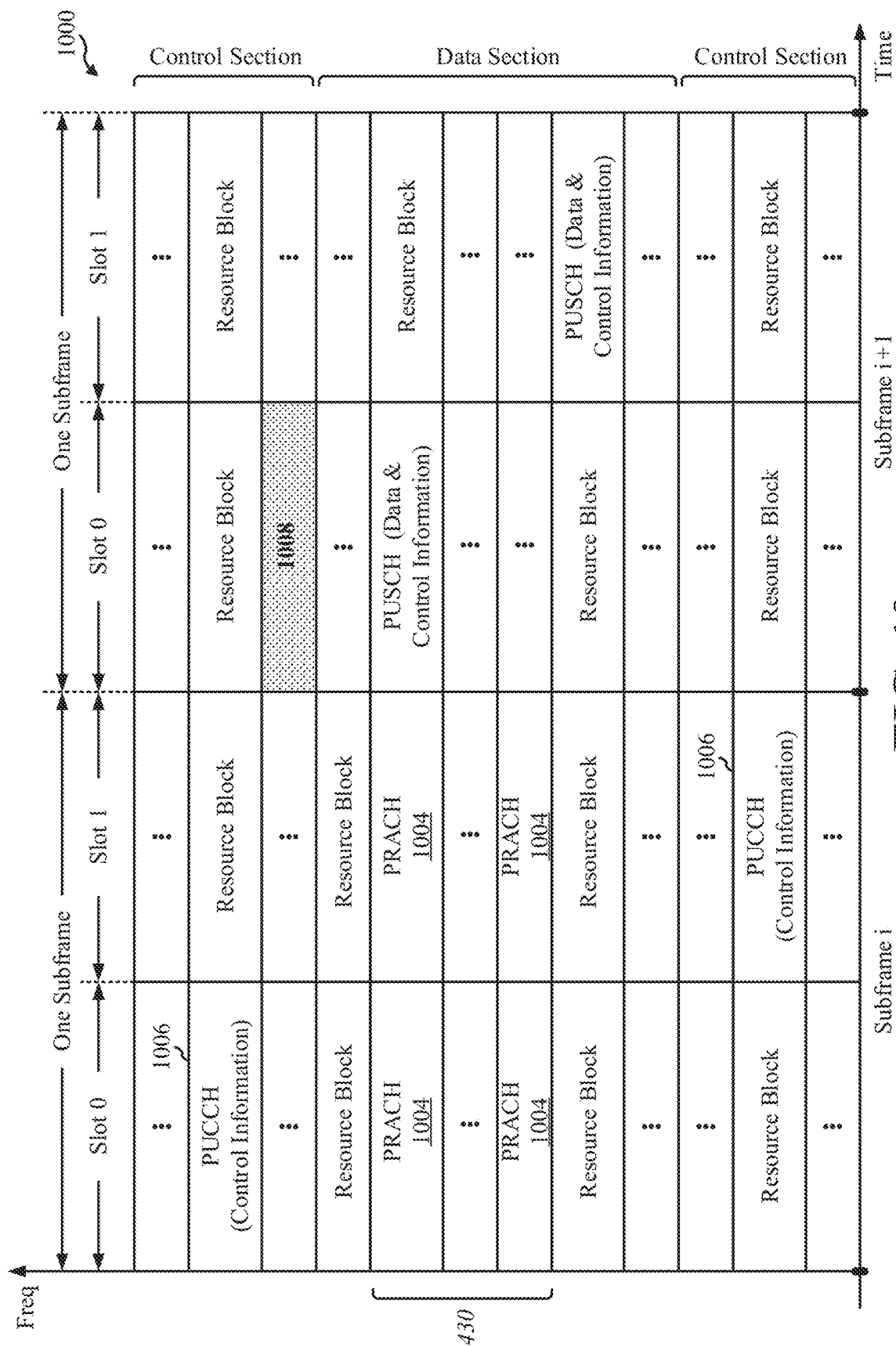
FIG. 10 is a diagram illustrating an exemplary uplink resource allocation using DSS according to some aspects.

In one aspect of the disclosure, an NR scheduling entity may apply a predetermined frequency offset (e.g., 7.5 kHz) from the DL band when allocating UL resources in the frequency domain for an NR UE. In some examples, the NR network may share a spectrum with an LTE UL band. The entire NR spectrum may be larger than the LTE UL band. FIG. 10 is a diagram illustrating an LTE uplink subframe 1000 that may be allocated to a spectrum that is included in an NR UL band. Referring to FIG. 10, when LTE and NR UL bands share a spectrum or UL band, the scheduling entity may schedule the NR UL channels/signals (e.g., PUCCH/PUSCH) to be transmitted on resources corresponding to LTE RBs that are not pre-configured for certain LTE control channels (e.g., PRACH 1004 and PUCCH 1006). In one example, the scheduling entity may schedule some or all resources corresponding to LTE RBs 1008 (e.g., RBs not allocated to LTE control channels) to NR UL channels/signals (e.g., PRACH, SRS, PUCCH and PUSCH).

Figure 11:
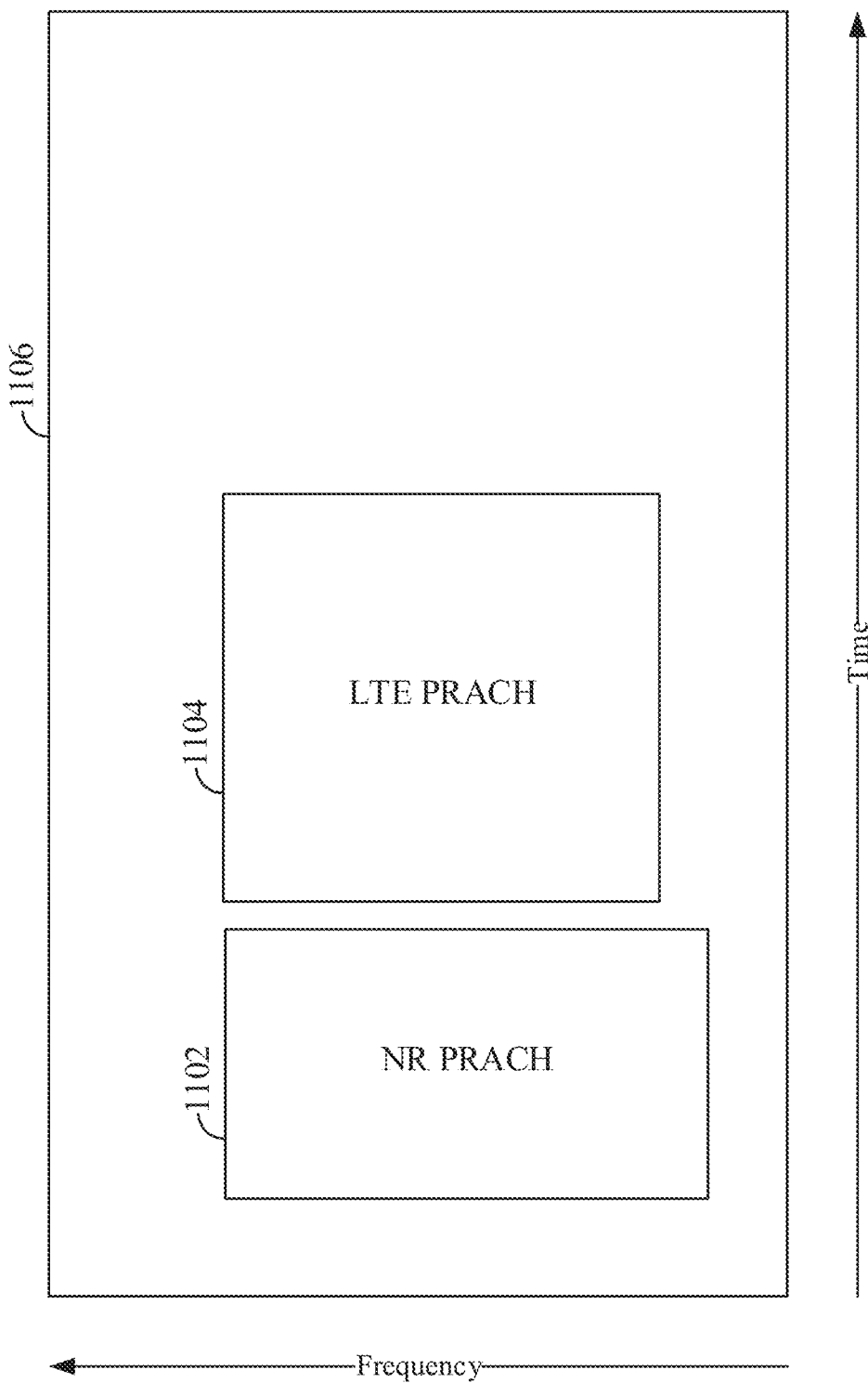
FIG. 11 is a diagram illustrating exemplary time multiplexing of an NR physical random access channel (PRACH) and an LTE PRACH in a shared spectrum.

In some aspects of the disclosure, the scheduling entity may schedule the random access procedure (RACH) occasions of an NR UE to be time-multiplexed and/or frequency-multiplexed with the LTE RACH occasions. The NR RACH may be a two-step RACH or a four-step RACH. FIG. 11 illustrates a dynamic spectrum sharing (DSS) example in which an NR physical random access channel (PRACH) 1102 is time-multiplexed (TDM) with an LTE PRACH 1104 in a spectrum 1106 shared between LTE and NR. In FIG. 11, the amount of resources respectively allocated to the NR PRACH 1102 and LTE PRACH 1104 in a TDM fashion are illustrative examples only. In other examples, the resources used for the NR PRACH 1120 and LTE PRACH 1104 may be different from those shown in FIG. 11.

Figure 12:
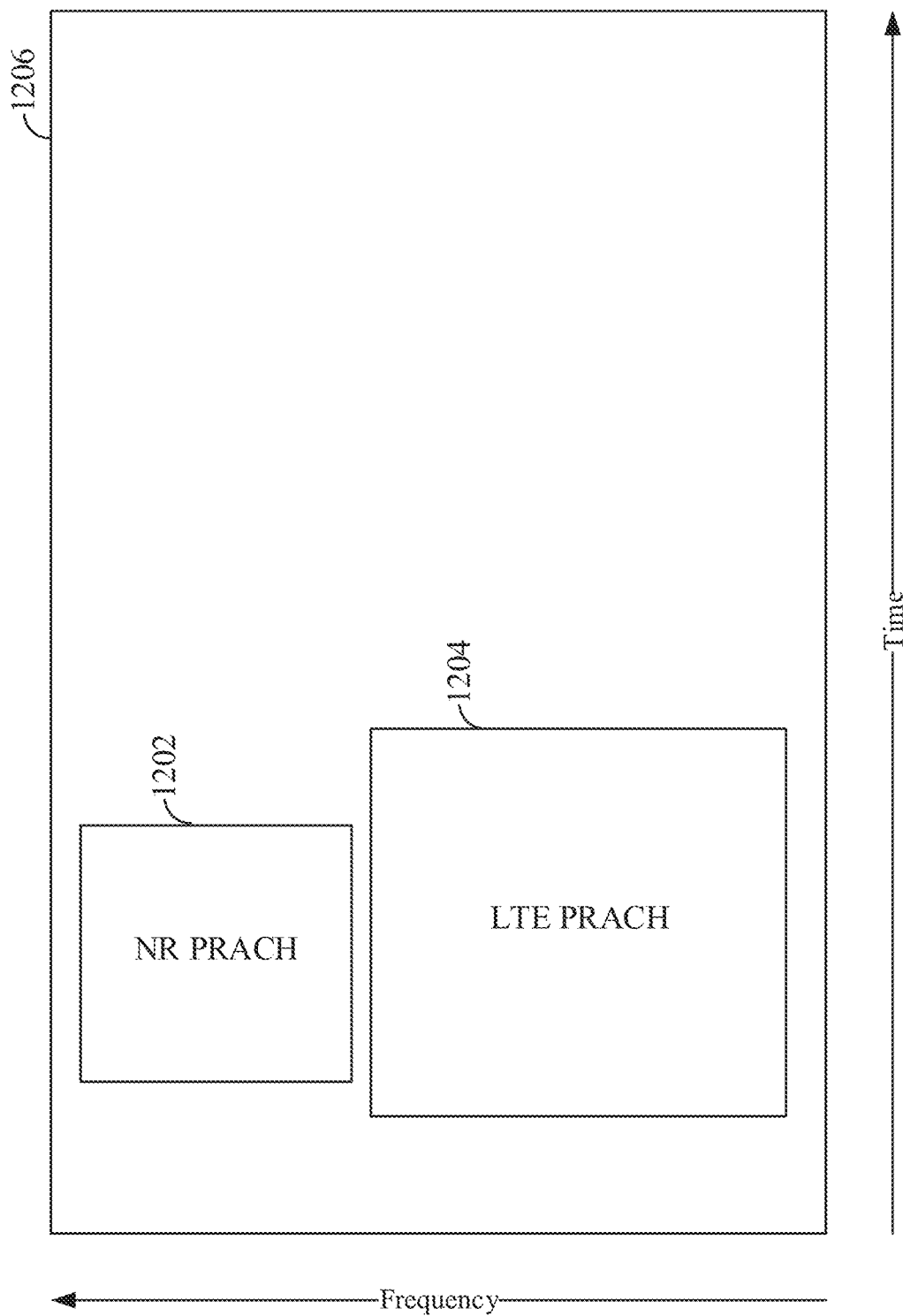
FIG. 12 is a diagram illustrating exemplary frequency multiplexing of an NR PRACH and an LTE PRACH in a shared spectrum.

FIG. 12 illustrates another DSS example in which an NR PRACH 1202 is frequency-multiplexed (FDM) with an LTE PRACH 1204 in a spectrum 1206 shared by LTE and NR. Different PRACH formats, numerology, and PRACH-configuration-index can be considered for NR and LTE resource allocations.

For UL coverage recovery, the UE may use signal repetition or frequency hopping at the mini-slot level. In one example, an NR UE may transmit an UL signal multiple times (i.e., repetition) using multiple mini-slots. In another example, an NR UE may transmit an UL signal using frequency hopping between mini-slots that are located at different carriers or frequencies.

Slot Format Configuration

Due to the spectrum sharing between LTE and NR, the slot format for an NR device may be subject to certain cell-specific scheduling constraints imposed by LTE resource allocation (e.g., CRS, PCFICH, PHICH, PRACH, etc.) as described above. For example, NR DL transmission opportunities may be punctured by or rate-matched around LTE CRS or other reference signals that are pre-configured to be at certain RBs. In some examples, an NR UE that supports full-duplex FDD (FD-FDD) operation can fall back to using HD-FDD operation and share resources with LTE devices. In that case, an NR UE using HD-FDD does not need to monitor the NR PDCCH and other NR DL channels/signals on the LTE CRS symbol locations. In some examples, the cell-specific scheduling constraints may include an LTE muting pattern (e.g., zero-powered CSI-RS, PRS transmission or interference coordination pattern). In some aspects of the disclosure, an NR device can exploit these scheduling constraints to reduce the processing complexity of the DL while using HD-FDD.

In some aspects, the scheduling entity can configure the NR UEs in the same cell to use a common slot format taking into account the DSS scheduling constraints described above. In some examples, the slot formats for an NR UE using LTE-NR DSS can be hard-coded in the standards or signaled by a scheduling entity (e.g., a base station), for example, via a radio resource control (RRC) configuration message or the like. In one example, a cell-specific slot format for an NR UE may include at least the following fields: DL mini-slot, UL mini-slot, guard period mini-slot, and special mini-slot. A special mini-slot can be used for DL or UL traffic. The DL mini-slot field can specify a common DL mini-slot for NR UEs in the same cell. The UL mini-slot field can specify a common UL mini-slot for NR UEs in the same cell. The guard period mini-slot field can specify resources in which a UE may switch between UL or DL. The UE may also use the guard period for supporting discontinuous reception (DRX) and discontinuous transmission (DTX). For power saving and complexity reduction in an RRC connected state, the UE may suspend monitoring the PDCCH and/or other DL channels during the guard period, which is a DRX interval in the RRC connected mode. On the other hand, the UE may suspend UL transmission during the guard period, which is a DTX interval, to relax the preparation time for UL transmissions such as PUSCH, PUCCH, and SRS.

Figure 13:
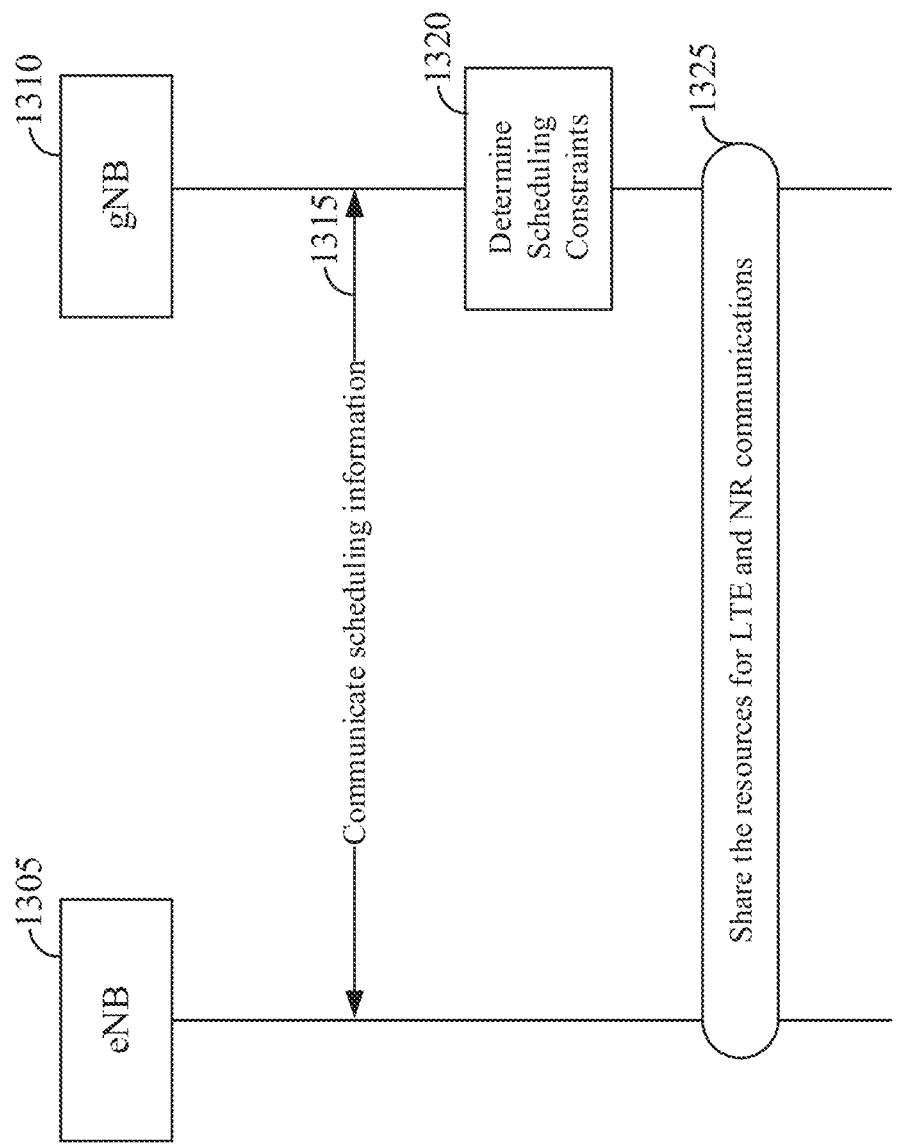
FIG. 13 is a diagram illustrating coordination between an LTE base station and an NR base station in sharing communication resources using DSS according to some aspects.

FIG. 13 is a diagram illustrating coordination between an LTE base station and an NR base station in sharing communication resources using DSS according to some aspects of the disclosure. An LTE base station 1305 (e.g., eNB) and an NR base station 1310 (e.g., gNB) can share communication resources (e.g., time-frequency-space resources) in wireless communication. A time-frequency-space resource can correspond to a certain combination of time (e.g., OFDM symbols), frequency (e.g., subcarriers), and spatial resources. The LTE base station 1305 can communicate with the NR base station, for example, using a wireless or wired backhaul connection (e.g., backhaul link 213). The base stations can exchange scheduling information 1315 via the backhaul connection by transmitting and/or receiving signals or messages via the backhaul link. For example, the LTE base station 1305 can communicate its DL scheduling information (e.g., CRS, PCFICH, PHICH, PRACH, etc.) and UL scheduling information (e.g., PRACH, SRS, PUSCH, and PUCCH) to the NR base station 1310. Based on the LTE scheduling information, at block 1320, the NR base station 1310 can determine the scheduling constraints in scheduling and allocating the shared resources to one or more NR devices (e.g., UEs). In some examples, the NR base station can allocate the shared resources to one or more of the NR devices that communicate with the base station using HD-FDD techniques. Thereafter, the base stations can coordinate resources sharing for LTE and NR communications 1325, for example, using suitable multiplexing schemes (e.g., FDM and/or TDM). For example, the NR base station 1310 avoid scheduling NR traffic in resources dedicated to certain LTE signals/channels (e.g., CRS, PCFICH, PHICH, PRACH, PRACH, and PUCCH).

Figure 14:
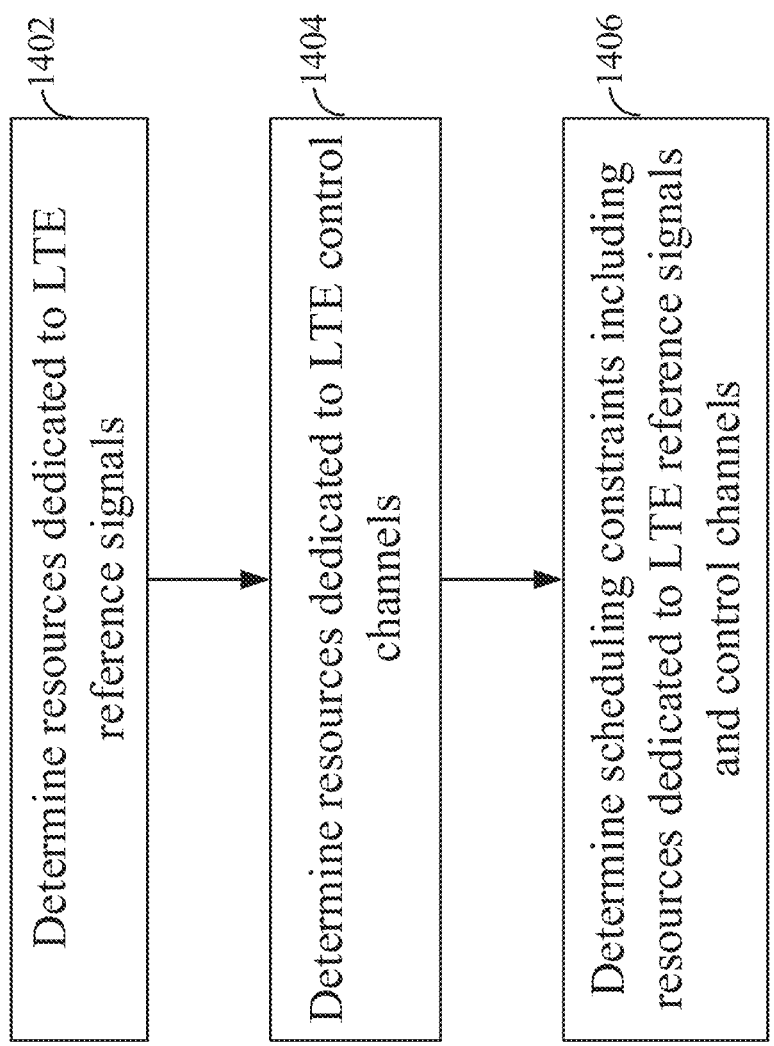
FIG. 14 is a flow chart illustrating an exemplary process for sharing a communication spectrum between different radio access technologies according to some aspects.

FIG. 14 is flow chart illustrating an exemplary process 1400 for determining scheduling constraints according to some aspects. The NR base station 1310 (e.g., gNB) can use the process 1400 to determine the scheduling constraints when sharing resources with an LTE network. At block 1402, the NR base station 1310 can determine resources that are dedicated to LTE reference signals. For example, the NR base station 1310 can receive information from the LTE base station 1305 about resources that are dedicated, reserved, scheduled, or allocated to LTE DL reference signals (e.g., CRS). At block 1404, the NR base station 1310 can determine resources that are dedicated to LTE channels. For example, the NR base station 1310 can receive information from the LTE base station 1305 about resources that are dedicated, reserved, scheduled, or allocated to LTE channels (e.g., PCFICH, PHICH, PRACH, PRACH, PUCCH etc.) At block 1406, the NR base station can determine the scheduling constraints including the resources dedicated to LTE reference signals and channels.

Figure 15:
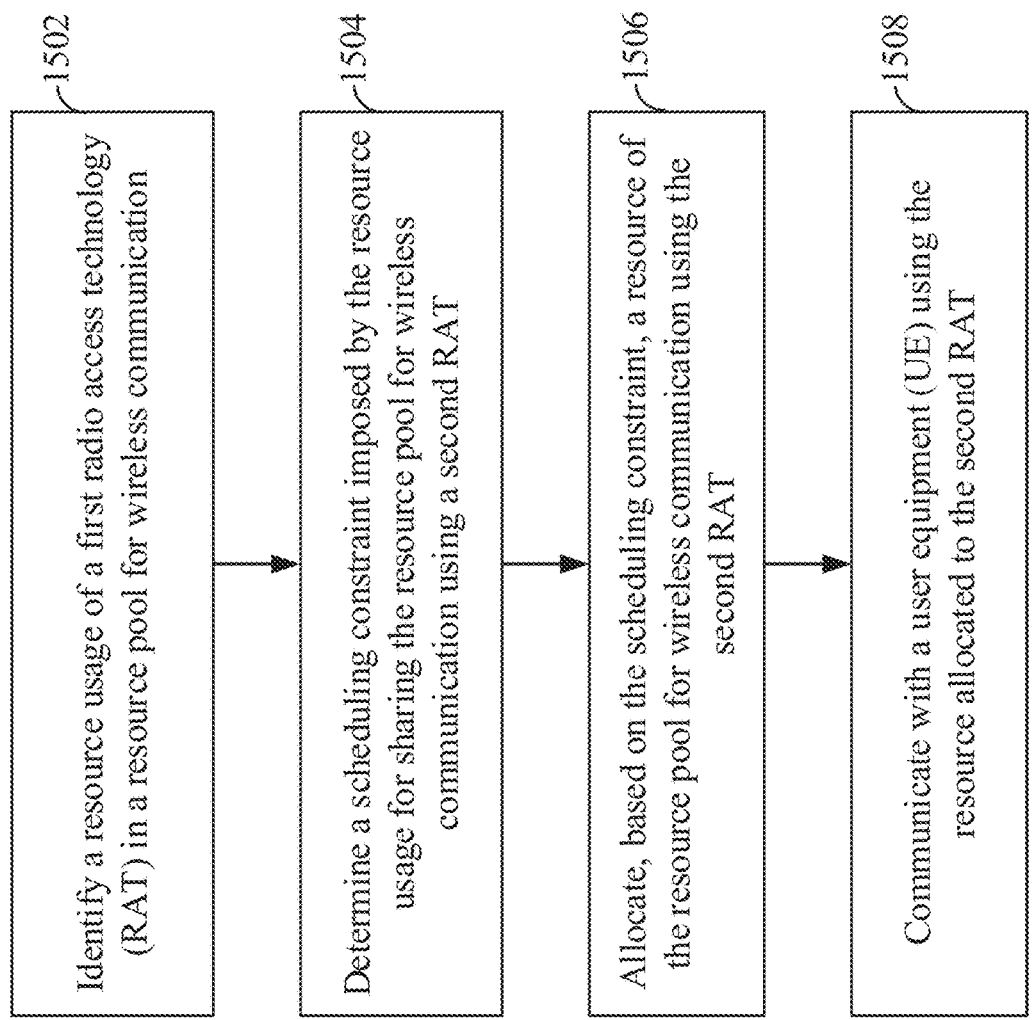
FIG. 15 is a flow chart illustrating an exemplary process for sharing a spectrum between different RATs in accordance with some aspects.

FIG. 15 is a flow chart illustrating an exemplary process 1500 for sharing a spectrum between different RATs in accordance with some aspects of the present disclosure. As described below, some or all illustrated features may be omitted in a particular implementation within the scope of the present disclosure, and some illustrated features may not be required for the implementation of all embodiments. In some examples, the process 1500 may be carried out by the scheduling entity 500 illustrated in FIG. 5. In some examples, the process 1500 may be carried out by any suitable apparatus (e.g., base station, gNB, eNB, TRP, etc.) or means for carrying out the functions or algorithm described below.

At block 1502, a scheduling entity may identify a resource usage of a first RAT (e.g., LTE) in a resource pool for wireless communication. In one example, the scheduling entity may be a base station of a second RAT (e.g., 5G NR) that shares the resource pool with the first RAT. The resource pool may be a spectrum that provides time-frequency-space resources that can be dynamically shared between the first and second RATs. In some aspects, a scheduling entity (e.g., gNB or eNB) can use the dynamically shared resources to communicate with a UE using the first RAT or the second RAT. In one example, the scheduling and resource allocation circuit 544 (see FIG. 5) can provide the means for identifying time-frequency-space resources scheduled and allocated for the first RAT (e.g., LTE communication). The scheduling entity of the second RAT may exchange scheduling information with a scheduling entity (e.g., eNB) of the first RAT to identify the resource allocation of the resource pool among the first RAT and second RAT. For example, the scheduling entity may identify an uplink resource usage and/or a downlink resource usage of the first RAT (e.g., LTE) using the processes described above in relation to FIGS. 13 and 14.

In some aspects, the downlink resource usage may include a resource of the resource pool dedicated to the first RAT, for example, at least one of CRS, PHICH, PCFICH, or PDCCH. The uplink resource usage may include a resource of the resource pool dedicated to the first RAT, for example, at least one of PRACH or PUCCH. In one example, these "dedicated resources" are reserved for LTE always-on signals, which are treated as scheduling constraints for NR communication. When NR and LTE networks share a spectrum, the scheduling constraint for NR can maintain backward compatibility with LTE and improves the co-existence of multiple RATs sharing the same spectrum on a subframe, slot, or symbol level.

At block 1504, the scheduling entity may determine a scheduling constraint imposed by the resource usage of the first RAT for sharing the resource pool (e.g., time-frequency-space resources) for wireless communication using a second RAT (e.g., 5G NR). In one example, the scheduling and resource allocation circuit 544 can provide the means for determining the scheduling constraint. In some aspects, the scheduling constraint may include a resource of the resource pool that is not available for wireless communication using the second RAT due to sharing a frequency spectrum between the first RAT and the second RAT. For example, the resource not available for the second RAT may include resources preconfigured or dedicated to carry some control or reference signals of the first RAT, for example, the CRS, PHICH, PCFICH, PDCCH, PRACH, and PUCCH.

At block 1506, the scheduling entity (e.g., gNB) may allocate, based on the scheduling constraint, a resource (e.g., one or more RB) of the resource pool for wireless communication using the second RAT. In one example, the scheduling and resource allocation circuit 544 can provide the means for allocating time-frequency-space resources (e.g., RBs) of a shared spectrum to the second RAT, for example, as described above in relation to FIGS. 6-14. For example, scheduling entity can allocate the resource that is not in conflict with the scheduling constraint (e.g., not dedicated to CRS, PHICH, PCFICH, PDCCH, PRACH, and/or PUCCH of the first RAT). In some examples, the time-frequency-space resources allocated to the second RAT may be grouped in one or more mini-slots, and each mini-slot spans a time interval corresponding to one or more time domain symbols of the first RAT. The time domain symbols of the first RAT may be included in a subframe that has a numerology aligned with a numerology of the first RAT. The mini-slots may use a numerology that is aligned with the numerology of the second RAT. The first RAT and second RAT may use the same numerology or different numerologies.

In some aspects, the scheduling entity may allocate the resource to an NR synchronization signal block (SSB) based on a predetermined frequency offset from an LTE synchronization signal (e.g., PSS/SSS/PBCH). A numerology of the frequency offset may be based on a numerology of the first RAT or a numerology of the second RAT. In some examples, the scheduling entity may allocate the resource to the NR SSB based on a predetermined slot offset from the LTE synchronization signal. A numerology of the slot offset may be based on a numerology of the first RAT or a numerology of the second RAT.

At block 1508, the scheduling entity may communicate with a user equipment (UE) using the resource allocated to the second RAT. In some aspects, the UE can communicate with the scheduling entity using HD-FDD that can save power and reduce complexity. Also, the UE can skip monitoring for DL signals/channels in resources that are included in the scheduling constraints. In some aspects, the UE may support FD-HDD and fallback to HD-FDD while using dynamic resource sharing. In one aspect, the second RAT communication circuit 542 can provide the means for communicating (e.g., UL and/or DL) with a UE (e.g., NR Light UE) using the resource allocated to the second RAT via the transceiver 510.

In one aspect, for coverage recovery, the scheduling entity may repeat a signal transmission of the second RAT using one or more mini-slots or transmit a signal of the second RAT using frequency hopping using the one or more mini-slots. The mini-slots may be consecutive and/or disjoint in time. When a numerology of the first RAT is different from a numerology of the second RAT, the scheduling entity may transmit a synchronization signal (e.g., SSB) of the second RAT that is not punctured by or rate matched around a reference signal (CRS) of the first RAT while sharing spectrum. In one example, the scheduling entity may transmit a synchronization signal (e.g., SSB) of the second RAT that is punctured by or rate matched around a reference signal (CRS), a cell-specific reference signal, a semi-persistently scheduled data channel (e.g., PDSCH or PUSCH) and/or a control channel of the first RAT while sharing the spectrum, and the first RAT and second RAT may use a same numerology or different numerologies. In one example, the scheduling entity may transmit an NR SS burst including a plurality of SSBs that are time-multiplexed with resources that are allocated to LTE such that the SSB beams may be distributed in the time domain. In some examples, the scheduling entity may transmit an SSB and a CORESET using time-division multiplexing, frequency-division multiplexing, and/or space-division multiplexing (e.g., spatial multiplexing), depending on a maximum supported bandwidth of the UE.

In some aspects, the scheduling entity may determine a cell-specific slot format of the second RAT based on the scheduling constraint and signal the cell-specific slot format to the UE using an RRC message. The cell-specific slot format may include information for configuring a downlink mini-slot, an uplink mini-slot, a guard period mini-slot, and a special mini-slot.

In one configuration, the apparatus 500 for wireless communication includes means for identifying a resource usage of a resource pool that is used for wireless communication using a RAT; means for determining a scheduling constraint imposed by the resource usage for sharing the resource pool for wireless communication using a second RAT; means for allocating, based on the scheduling constraint, a resource of the resource pool for wireless communication using the second RAT; and means for communicating with a UE using the resource allocated to the second RAT. In one aspect, the aforementioned means may be the processor 504 shown in FIG. 5 configured to perform the functions recited by the aforementioned means. In another aspect, the aforementioned means may be a circuit or any apparatus configured to perform the functions recited by the aforementioned means.

Of course, in the above examples, the circuitry included in the processor 504 is merely provided as an example, and other means for carrying out the described functions may be included within various aspects of the present disclosure, including but not limited to the instructions stored in the computer-readable storage medium 506, or any other suitable apparatus or means described in any one of the FIGS. 1,2, and/or 3, and utilizing, for example, the processes and/or algorithms described herein in relation to FIGS. 6-14.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The following provides an overview of some aspects of the present disclosure.

Aspect 1: A method for spectrum sharing in wireless communication, the method comprising: identifying a resource usage of a resource pool for wireless communication using a first radio access technology (RAT); determining a scheduling constraint imposed by the resource usage of the first RAT for sharing the resource pool for wireless communication using a second RAT; allocating, based on the scheduling constraint, a resource of the resource pool for wireless communication using the second RAT; and communicating with a user equipment (UE) using the resource allocated to the second RAT.

Aspect 2: The method of aspect 1, wherein identifying the resource usage comprises at least one of: identifying an uplink resource usage dedicated to the first RAT; or identifying a downlink resource usage dedicated to the first RAT.

Aspect 3: The method of aspect 2, wherein the downlink resource usage comprises a resource of the resource pool used for at least one of: cell-specific reference signals (CRS); a physical HARQ indicator channel (PHICH); a physical control format indicator channel (PCFICH); a physical downlink shared channel (PDSCH); a channel state information reference signal (CSI-RS); a positioning reference signal (PRS); or a physical downlink control channel (PDCCH).

Aspect 4: The method of aspect 2, wherein the uplink resource usage comprises a resource of the resource pool used for at least one of: a physical random access channel (PRACH); a sounding reference signal (SRS); a physical uplink shared channel (PUSCH); or a physical uplink control channel (PUCCH).

Aspect 5: The method of any of aspects 1 through 4, wherein the scheduling constraint comprises at least one of: a time-frequency-space resource of the resource pool that is not available for wireless communication using the second RAT due to sharing a frequency spectrum including the time-frequency-space resource between the first RAT and the second RAT; a muting pattern of the first RAT; or a predetermined frequency offset from an LTE synchronization signal.

Aspect 6: The method of aspects 1 through 5, wherein the resource comprises a plurality of time-frequency-space resources that are grouped in one or more mini-slots based on a numerology of the second RAT, each mini-slot spanning a time interval corresponding to one or more time domain symbols based on a numerology of the first RAT or the second RAT.

Aspect 7: The method of aspect 6, wherein communicating with the UE comprises at least one of: repeating a signal transmission of the second RAT using the one or more mini-slots; or transmitting a signal of the second RAT using frequency hopping in the one or more mini-slots.

Aspect 8: The method of any of aspects 1 through 7, wherein communicating with the UE comprises: transmitting a synchronization signal block (SSB) of the second RAT that is not punctured by a reference signal of the first RAT, a numerology of the first RAT being different from a numerology of the second RAT.

Aspect 9: The method of any of aspects 1 through 7, wherein communicating with the UE comprises: transmitting a synchronization signal block (SSB) of the second RAT that is punctured by or rate matched around a cell-specific reference signal, a control channel, or a semi-persistently scheduled downlink data channel of the first RAT.

Aspect 10: The method of any of aspects 1 through 7, wherein communicating with the UE comprises: transmitting a synchronization signal block (SSB) and a control resource set (CORESET) of the second RAT using time-division multiplexing, frequency-division multiplexing, or space-division-multiplexing, depending on at least one of a bandwidth constraint, a power constraint, or capabilities of the UE.

Aspect 11: The method of aspect 10, wherein allocating the resource comprises at least one of: allocating the resource to the SSB based on a predetermined frequency offset from a synchronization signal of the first RAT, wherein a numerology of the frequency offset is based on a numerology of the first RAT or a numerology of the second RAT; or allocating the resource to the SSB based on a predetermined slot offset from the synchronization signal of the first RAT, wherein a numerology of the slot offset is based on a numerology of the first RAT or a numerology of the second RAT.

Aspect 12: The method of aspect 10, wherein transmitting the SSB comprises: transmitting an SSB burst comprising a plurality of SSBs that are time-multiplexed, frequency-multiplexed, or space-multiplexed with resources of the resource pool that are dedicated to the first RAT.

Aspect 13: The method of any of aspects 1 through 12, wherein allocating the resource comprises: allocating resources of the resource pool to a random access procedure (RACH) of the second RAT that is time-multiplexed or frequency-multiplexed with one or more RACH occasions of the first RAT.

Aspect 14: The method of any of claims 1 through 13, further comprising: determining a cell-specific slot format of the second RAT based on the scheduling constraint, wherein the cell-specific slot format comprises information for configuring at least one of a downlink mini-slot, an uplink mini-slot, a guard period mini-slot, and a special mini-slot; and transmitting a radio resource control (RRC) message including the cell-specific slot format to a user equipment using the second RAT.

Aspect 15: An apparatus configured for wireless communication comprising at least one means for performing a method of any one of aspects 1 through 14.

Aspect 16: A non-transitory computer-readable medium storing computer-executable code, comprising code for causing an apparatus to perform a method of any one of aspects 1 through 14.

What is claimed is:

1. A method for spectrum sharing in wireless communication at a first scheduling entity, the method comprising:
exchanging scheduling information with a second scheduling entity, the scheduling information identifying a resource usage of a first radio access technology (RAT) in a resource pool for wireless communication, the second scheduling entity associated with the first RAT;
determining a scheduling constraint imposed by the resource usage of the first RAT for sharing the resource pool for wireless communication using a second RAT, the first scheduling entity associated with the second RAT;
allocating, based on the scheduling constraint, a resource of the resource pool for wireless communication using the second RAT, the resource comprising a plurality of time-frequency-space resources that are grouped in one or more mini-slots based on a numerology of the second RAT, each mini-slot spanning a time interval corresponding to one or more time domain symbols based on a numerology of the first RAT or the second RAT; and
communicating with a user equipment (UE) using the resource allocated to the second RAT.

2. The method of claim 1, wherein the communicating with the UE comprises communicating with the UE using half-duplex frequency division duplex (HD-FDD) with the resource allocated to the second RAT.

3. The method of claim 2,
wherein identifying the resource usage comprises identifying a downlink resource usage dedicated to the first RAT as the scheduling constraint for using the second RAT, and the downlink resource usage comprises a resource of the resource pool used for at least one of:
a physical HARQ indicator channel (PHICH);
a physical control format indicator channel (PCFICH);
a physical downlink shared channel (PDSCH);
a channel state information reference signal (CSI-RS); or
a positioning reference signal (PRS).

4. The method of claim 2,
wherein identifying the resource usage comprises identifying an uplink resource usage dedicated to the first RAT as the scheduling constraint for using the second RAT, and the uplink resource usage comprises a resource of the resource pool used for at least one of:
a sounding reference signal (SRS);
a physical uplink shared channel (PUSCH); or
a physical uplink control channel (PUCCH).

5. The method of claim 1, wherein the scheduling constraint comprises a predetermined frequency offset or slot offset from an LTE synchronization signal.

6. The method of claim 1, wherein communicating with the UE comprises at least one of:
repeating a signal transmission of the second RAT using the one or more mini-slots; or
transmitting a signal of the second RAT using frequency hopping in the one or more mini-slots.

7. The method of claim 1, wherein communicating with the UE comprises:
transmitting a synchronization signal block (SSB) of the second RAT that is not punctured by a reference signal of the first RAT, a numerology of the first RAT being different from a numerology of the second RAT.

8. The method of claim 1, wherein communicating with the UE comprises:
transmitting a synchronization signal block (SSB) of the second RAT that is punctured by or rate-matched around a cell-specific reference signal, a control channel, or a semi-persistently scheduled downlink data channel of the first RAT.

9. The method of claim 1, wherein communicating with the UE comprises:
transmitting a synchronization signal block (SSB) and a control resource set (CORESET) of the second RAT using time-division multiplexing, frequency-division multiplexing, or space-division-multiplexing, depending on at least one of a bandwidth constraint, a power constraint, or capabilities of the UE.

10. The method of claim 9, wherein allocating the resource comprises at least one of:
  allocating the resource to the SSB based on a predetermined frequency offset from a synchronization signal of the first RAT, wherein a numerology of the frequency offset is based on a numerology of the first RAT or a numerology of the second RAT; or
  allocating the resource to the SSB based on a predetermined slot offset from the synchronization signal of the first RAT, wherein a numerology of the slot offset is based on a numerology of the first RAT or a numerology of the second RAT.

11. The method of claim 9, wherein transmitting the SSB comprises:
  transmitting an SSB burst comprising a plurality of SSBs that are time-multiplexed, frequency-multiplexed, or space-multiplexed with resources of the resource pool that are dedicated to the first RAT.

12. The method of claim 1, wherein allocating the resource comprises:
  allocating resources of the resource pool to a random access procedure (RACH) of the second RAT that is time-multiplexed or frequency-multiplexed with one or more RACH occasions of the first RAT.

13. The method of claim 1, further comprising:
  determining a cell-specific slot format of the second RAT based on the scheduling constraint, wherein the cell-specific slot format comprises information for configuring at least one of a downlink mini-slot, an uplink mini-slot, a guard period mini-slot, and a special mini-slot; and
  transmitting a radio resource control (RRC) message including the cell-specific slot format to a user equipment using the second RAT.

14. A first scheduling entity for wireless communication, comprising:
  a communication interface configured for wireless communication using spectrum sharing between a first radio access technology (RAT) and a second RAT;
  a memory; and
  a processor coupled with the communication interface and the memory,
  the processor and the memory being configured to:
    exchange scheduling information with a second scheduling entity, the scheduling information identifying a resource usage of the first RAT in a resource pool for wireless communication, the second scheduling entity associated with the first RAT;
    determine a scheduling constraint imposed by the resource usage of the first RAT for sharing the resource pool for wireless communication using the second RAT, the first scheduling entity associated with the second RAT;
    allocate, based on the scheduling constraint, a resource of the resource pool for wireless communication using the second RAT, the resource comprising a plurality of time-frequency-space resources that are grouped in one or more mini-slots based on a numerology of the second RAT, each mini-slot spanning a time interval corresponding to one or more time domain symbols based on a numerology of the first RAT or the second RAT; and
    communicate with a user equipment (UE) using the resource allocated to the second RAT.

15. The apparatus of claim 14, wherein the processor and the memory are configured to communicate with the UE using half-duplex frequency division duplex (HD-FDD) with the resource allocated to the second RAT.

16. The apparatus of claim 15,
  wherein the resource usage comprises a downlink resource usage dedicated to the first RAT as the scheduling constraint for using the second RAT, and the downlink resource usage comprises a resource of the resource pool used for at least one of:
    a physical HARQ indicator channel (PHICH);
    a physical control format indicator channel (PCFICH);
    a physical downlink shared channel (PDSCH);
    a channel state information reference signal (CSI-RS); or
    a positioning reference signal (PRS).

17. The apparatus of claim 15,
  wherein the resource usage comprises an uplink resource usage dedicated to the first RAT as the scheduling constraint for using the second RAT, and the uplink resource usage comprises a resource of the resource pool used for at least one of:
    a sounding reference signal (SRS);
    a physical uplink shared channel (PUSCH); or
    a physical uplink control channel (PUCCH).

18. The apparatus of claim 14, wherein the scheduling constraint comprises a predetermined frequency offset or slot offset from an LTE synchronization signal.

19. The apparatus of claim 14, wherein, for communicating with the UE, the processor and the memory are further configured to at least one of:
  repeat a signal transmission of the second RAT using the one or more mini-slots; or
  transmit a signal of the second RAT using frequency hopping using the one or more mini-slots.

20. The apparatus of claim 14, wherein, for communicating with the UE, the processor and the memory are further configured to:
  transmit a synchronization signal block (SSB) of the second RAT that is not punctured by a reference signal of the first RAT, a numerology of the first RAT being different from a numerology of the second RAT.

21. The apparatus of claim 14, wherein, for communicating with the UE, the processor and the memory are further configured to:
  transmit a synchronization signal block (SSB) of the second RAT that is punctured by or rate matched around a cell-specific reference signal, a control channel, or a semi-persistently scheduled downlink data channel of the first RAT.

22. The apparatus of claim 14, wherein, for communicating with the UE, the processor and the memory are further configured to:
  transmit a synchronization signal block (SSB) and a control resource set (CORESET) of the second RAT using time-division multiplexing, frequency-division multiplexing, or space-division-multiplexing, depending on at least one of a bandwidth constraint, a power constraint, or capabilities of the UE.

23. The apparatus of claim 22, wherein, for allocating the resource, the processor and the memory are further configured to at least one of:
  allocate the resource to the SSB based on a predetermined frequency offset from a synchronization signal of the first RAT, wherein a numerology of the frequency offset is based on a numerology of the first RAT or a numerology of the second RAT; or allocate the resource to the SSB based on a predetermined slot offset from the synchronization signal of the first RAT, wherein a numerology of the slot offset is based on a numerology of the first RAT or a numerology of the second RAT.

24. The apparatus of claim 22, wherein, for transmitting the SSB, the processor and the memory are further configured to:
transmit an SSB burst comprising a plurality of SSBs that are time-multiplexed, frequency-multiplexed, or space-multiplexed with resources of the resource pool that are dedicated to the first RAT.

25. The apparatus of claim 14, wherein, for allocating the resource, the processor and the memory are further configured to:
allocate resources of the resource pool to a random access procedure (RACH) of the second RAT that is time-multiplexed or frequency-multiplexed with one or more RACH occasions of the first RAT.

26. The apparatus of claim 14, wherein the processor and the memory are further configured to:
determine a cell-specific slot format of the second RAT based on the scheduling constraint, wherein the cell-specific slot format comprises information for configuring at least one of a downlink mini-slot, an uplink mini-slot, a guard period mini-slot, and a special mini-slot; and
transmit a radio resource control (RRC) message including the cell-specific slot format to a user equipment using the second RAT.

27. A first scheduling entity for wireless communication using spectrum sharing, comprising:
means for exchanging scheduling information with a second scheduling entity, the scheduling information identifying a resource usage of a first radio access technology (RAT) in a resource pool for wireless communication, the second scheduling entity associated with the first RAT;
means for determining a scheduling constraint imposed by the resource usage of the first RAT for sharing the resource pool for wireless communication using a second RAT, the first scheduling entity associated with the second RAT;
means for allocating, based on the scheduling constraint, a resource of the resource pool for wireless communication using the second RAT, the resource comprising a plurality of time-frequency-space resources that are grouped in one or more mini-slots based on a numerology of the second RAT, each mini-slot spanning a time interval corresponding to one or more time domain symbols based on a numerology of the first RAT or the second RAT; and
means for communicating with a user equipment (UE) using the resource allocated to the second RAT.

28. A non-transitory computer-readable medium storing computer-executable code at a first scheduling entity for wireless communication using dynamic spectrum sharing, comprising code for causing a processor to:
exchange scheduling information with a second scheduling entity, the scheduling information identifying a resource usage of a first radio access technology (RAT) in a resource pool for wireless communication, the second scheduling entity associated with the first RAT;
determine a scheduling constraint imposed by the resource usage of the first RAT for sharing the resource pool for wireless communication using a second RAT, the first scheduling entity associated with the second RAT;
allocate, based on the scheduling constraint, a resource of the resource pool for wireless communication using the second RAT, the resource comprising a plurality of time-frequency-space resources that are grouped in one or more mini-slots based on a numerology of the second RAT, each mini-slot spanning a time interval corresponding to one or more time domain symbols based on a numerology of the first RAT or the second RAT; and
communicate with a user equipment (UE) using the resource allocated to the second RAT.

* * * * *